United States Patent [19]

Patel

[11] Patent Number: 4,963,602

[45] Date of Patent: Oct. 16, 1990

[54] AQUEOUS EPOXY RESIN-ACRYLIC RESIN COATING COMPOSITIONS CONTAINING ALSO PHENOXY, NOVOLAC AND RESOLE RESIN COMBINATION

[75] Inventor: Hirendra K. Patel, Louisville, Ky.

[73] Assignee: Hi-Tek Polymers, Inc., Jeffersontown, Ky.

[21] Appl. No.: 435,587

[22] Filed: Nov. 13, 1989

[51] Int. Cl.$^5$ .................. C08F 8/00; C08L 61/04; C08L 63/00
[52] U.S. Cl. .................. 523/403; 523/404; 525/109
[58] Field of Search .................. 523/403, 404; 525/109

[56] References Cited

U.S. PATENT DOCUMENTS

| 4,547,535 | 10/1985 | Brown et al. | 525/530 |
| 4,579,888 | 4/1986 | Kodama et al. | 523/100 |
| 4,751,256 | 1/1988 | Patel et al. | 523/100 |

Primary Examiner—Earl Nielsen
Assistant Examiner—Frederick Krass
Attorney, Agent, or Firm—Herbert P. Price

[57] ABSTRACT

Heat curable coating compositions particularly suitable as coatings for metal can ends are made from aqueous dispersions of epoxy resins, acrylic resins which are copolymers of polymerizable acids and other monomers, phenoxy resins, alkylated phenol novolac resins and resol resins.

12 Claims, No Drawings

AQUEOUS EPOXY RESIN-ACRYLIC RESIN COATING COMPOSITIONS CONTAINING ALSO PHENOXY, NOVOLAC AND RESOLE RESIN COMBINATION

The field of art to which this invention pertains is aqueous epoxy resin/acrylic acid copolymer dispersions useful as can coating compositions.

In the manufacture of metal containers, a thin protective synthetic resin coating is applied to the interior of the container to prevent contact of the metal surface of the can with its contents. Such coatings ideally should have good adhesion to the interior metal surface, low extractables to prevent contamination of the container contents, and a rapid cure or drying rate for economy of container manufacture. Synthetic resin coating compositions which have been used for a number of years include organic solutions of vinyl resins, polybutadiene resins, epoxy resins, aminoplast and phenolplast resins and oleoresinous materials.

Coatings used on the ends of beer or beverage cans have special requirements. The outside coatings for the ends are applied as a transparent film ranging in weight from 1.5 to 2.5 milligrams per square inch (msi). This weight range is also used on the interior of ends for beer cans. For beverage cans, the interior weight ranges from 7.5 to 10.0 msi. The coatings on the exterior are severely tested on the rivet and score areas during fabrication and including the double seaming process to attach the end onto a can. For protection of the interior surface, the fundamental concern is product flavor preservation. Acceptable film performance mandates practically no metal exposure as measured by a standard enamel rater test. Other significant performance criteria include beer and water pasteurization, corrosion protection, minimum extractables and gloss.

In order to reduce the use of organic solvents, efforts have been made to convert the coating compositions to water-borne systems. One such system is described in U.S. Pat. No. 4,247,439 wherein a blend of an epoxy resin, an acrylic copolymer which contains carboxylic acid groups and a tertiary amine are dispersed in water.

Another approach to an aqueous coating composition is described in U.S. Pat. No. 4,289,811. Acrylic or methacrylic acid is copolymerized with other monomers in the presence of an aminoplast resin followed by the addition of an epoxy resin and an amine.

In U.S. Pat. No. 4,212,781, acrylic or methacrylic acid is copolymerized with another monomer in the presence of an epoxy resin, a glycidyl polyether of a dihydric phenol. Some of the resulting copolymer forms a graft polymer with the backbone of the epoxy resin. The graft polymer and acrylic acid copolymer, are then neutralized with an amine and dispersed in water.

U.S. Pat. No. 4,442,246 describes sanitary can coating compositions made from the reaction product of an acid copolymer and a partially terminated epoxy resin, neutralized with an amine and dispersed in water.

In U.K. Pat. No. 2,068,967, epoxy resins are partially reacted with acrylic acid copolymers and the reaction product is neutralized with an amine and dispersed in water to form coating compositions.

In U.S. Pat. No. 4,547,535, aqueous coating compositions are made by emulsifying in water the reaction product of a carboxyl containing copolymer and an epoxy resin. Aminoplast or phenolplast resins in small proportions may be added to enhance the cure on baking.

Aqueous resin dispersions, according to U.S. Pat. No. 4,579,888, are prepared by dispersing in water the ammonia or amine salt of the reaction product of an acrylic resin, an epoxy resin and a phenolic resin.

U.S. Pat. No. 4,751,256 describes coating compositions made from aqueous dispersions of epoxy resins, acrylic resins, and alkylated phenol novalac resins.

SUMMARY OF INVENTION

This invention is directed to aqueous epoxy/acrylic resin dispersions useful as can coatings. In one aspect, this invention relates to aqueous epoxy/acrylic resin dispersions modified with a phenoxy resin, a novolac resin and a resol resin. In another aspect, this invention pertains to aqueous epoxy/acrylic resin dispersions modified with a phenoxy resin, a novolac resin, a resol resin and aminoplast resins.

The compositions of this invention are made from:
a. about 35 to about 55 weight percent epoxy resin wherein the epoxy resin is a glycidyl polyether of a dihydric phenol having an epoxide equivalent weight of about 1200 to about 6000;
b. about 7 to about 30 weight percent acrylic resin wherein the resin is a copolymer of a polymerizable ethylenically unsaturated carboxylic acid and another monomer polymerizable therewith, said resin containing about 5 to about 45 weight percent, based on the weight of acrylic resin, of polymerizable acid;
c. about 10 to about 30 weight percent phenoxy resin which is the reaction product of epichlorohydrin and Bisphenol A having a molecular weight of about 6,000 to about 85,000.
d. about 5 to about 15 weight percent of an alkylated phenol novolac resin having a molecular weight of about 1000 to about 4000 wherein the alkyl group of the novolac resin contains 8 to 12 carbon atoms; and
e. 3 to about 10 weight percent resol resin which is an alkaline catalyzed thermosetting phenol-formaldehyde resin The weight percents of epoxy resin, acrylic resin, phenoxy resin, novolac resin and resol resin are based on the total weight of the five components.

The compositions can be modified with up to about 5 weight percent aminoplast resin based on the weight of the total composition. Further modifications can be made with up to 30 weight percent thermoplastic vinyl resin based again on the weight of the total composition.

When neutralized with ammonia or an amine, the resinous compositions can be dispersed in water to form stable dispersions which are readily formulated into coating compositions. The compositions have good flexibility and toughness making them suitable for the precoating of metal which is to be fabricated.

DESCRIPTION OF THE INVENTION

The epoxy resins useful in this invention are glycidyl polyethers of dihydric phenols and contain more than one 1,2-epoxide group per molecule. Such epoxy resins are derived from an epihalohydrin and a polyhydric phenol and have epoxide equivalent weights of about 1200 to about 6000. Examples of epihalohydrins are epichlorohydrin, epibromohydrin and epiiodohydrin with epichlorohydrin being preferred. Dihydric phenols are exemplified by resorcinol, hydroquinone, p,p'- dihydroxydiphenyl propane (or Bisphenol A as it is commonly called), p,p'-dihydroxydiphenyl, p,p'-dihydroxydiphenyl methane, p,p'-dihydroxydiphenyl ethane, bis(2-hydroxynaphthyl) methane, 1,5-dihydroxy naphthalene and the like. Bisphenol A is the preferred dihydric phenol. The preferred epoxy resin for use in this invention has an epoxide equivalent weight of about 2000 to about 2800.

The acrylic resin useful in this invention is a carboxyl-functional polymer which is prepared by conventional free radical polymerization processes from at least one polymerizable, ethylenically unsaturated carboxylic acid monomer and at least one polymerizable, ethylenically unsaturated monomer free of acid groups. Suitable polymerizable carboxylic acid monomers include acrylic acid, methacrylic acid, crotonic acid, itaconic acid, maleic acid or anhydride, fumaric acid, the monoesters of the dicarboxylic acid monomers, such as methyl hydrogen maleate or ethyl hydrogen fumarate, and the like.

Suitable polymerizable, ethylenically unsaturated monomers free of acid groups are vinyl aromatic compounds and alkyl esters of polymerizable ethylenically unsaturated carboxylic acids. Examples of such monomers include styrene, halostyrenes, vinyl toluene, vinyl naphthalene, the methyl, ethyl, propyl, butyl, hexyl, ethylhexyl and lauryl acrylates, methacrylates and crotonates, dimethyl maleate, dibutylfumarate and the like. Mixtures of these monomers can also be used.

Other suitable polymerizable, ethylenically unsaturated monomers include vinyl chloride, acrylonitrile, methacrylonitrile, vinyl acetate, vinyl propionate, vinyl stearate, isobutoxymethyl acrylamide and the like.

The preferred monomers are styrene, methyl acrylate, ethyl acrylate, butyl acrylate, acrylic acid and methacrylic acid. The most preferred are styrene, ethyl acrylate and acrylic acid.

The acrylic resin should contain about 5 to about 45 weight percent polymerizable acid and, preferably, about 20 to about 40 weight percent. The acid number of the resin will generally be within the range of about 180 to about 300. The molecular weight of the acrylic acid copolymer will range from about 1000 to about 12,000.

The novolac resins useful in this invention are those made from alkylated phenols and formaldehyde. Novolac resins are made by reacting the phenol with formaldehyde under acid conditions. The resulting resins have the phenol moieties linked together through methylene bridges. The resins contain no methylol groups. The alkylated phenol novolac resins useful in this invention have alkyl groups which contain about 8 to about 12 carbon atoms. Examples of such alkyl groups are 2-ethylhexyl, nonyl, decyl, undecyl and dodecyl with nonyl being preferred. A portion of the $C_8$ to $C_{12}$ alkyl phenol novolac resin can, advantageously, in some instances, be replaced with up to 10 weight percent, based on total weight of the novolac resin, of a novolac resin which contains no alkyl substituents or wherein the alkyl group contains one to seven carbon atoms, i.e., $C_0$ to $C_7$ alkyl substituents. The novolac resins useful in this invention have molecular weights of about 250 to about 5000 and, preferably, about 1500 to about 3000.

The resol resins useful in this reaction are referred to as A-stage resins, or one-step resins. Such resins are thermosetting and are the product of the alkaline catalyzed reaction of a phenol with an excess of formaldehyde. Resol resins are made up of the phenol moieties linked together through methylene bridges and contain methylol group substitution on the benzene ring. Phenolic compounds which can be used to make the resol resins are phenol and substituted phenols which have a 1 to 8 carbon alkyl substituent in the ortho, meta, or para position. A particularly preferred resol resin is one wherein the phenolic compound is Bisphenol A. Useful resol resins are those which have softening points of about 55 to about 85° C., and a cure time on a hot plate at 185° C. of about 50 seconds to about 130 seconds. Resol resins are described in detail in "Encyclopedia of Polymer Science and Technology"b, Volume 10, pages 1 through 14 (1969) which is hereby incorporated by reference.

"Phenoxy resins" is the generic term used to describe the amorphous, high-molecular-weight poly(hydroxy ethers) derived from diphenols and epichlorohydrin. Phenoxy resins useful in this invention are the high molecular weight reaction products of Bisphenol A and epichlorohydrin. Such poly(hydroxy ether) reaction products have molecular weights which range from about 6,000 to about 85,000. Phenoxy resins are described in detail in "Encyclopedia of Polymer Science and Technology", Volume 10, pages 111-122 (1969) which is hereby incorporated by reference.

In the manufacture of the coating compositions of this invention, the phenoxy resin can be reacted either at 100 percent solids in powder form or as an aqueous dispersion as described in U.S. Pat. No. 4,355,122 which is hereby incorporated by reference.

The aminoplast resins useful in this invention are the well known reaction products of urea and triazine compounds with aldehydes further etherified with alcohols. Such resins include those derived from urea, thiourea, ethylene urea, melamine, benzoguanamine and acetoguanamine. The aldehydes used in the reaction with the urea and triazine are 1 to 8 carbon aldehydes, e.g., formaldehyde and the formaldehyde forming compounds, trioxane and paraformaldehyde, acetaldehyde, propionaldehyde and butyraldehyde. Alcohols which are used to alkylate or etherify the urea and triazine-aldehyde reaction products are 1 to 8 carbon monohydric alcohol, e.g., methyl alcohol, isopropyl alcohol, butyl alcohol and 2-ethylhexyl alcohol. Details on aminoplast resins can be found in "Encyclopedia of Polymer Science and Technology", Volume 2, pages 1–94, Interscience Publishers (1965), which is hereby incorporated by reference.

The preferred aminoplast resins for use in this invention are butylated urea-formaldehyde resins, methylated and butylated melamine-formaldehyde and benzoguanamine-formaldehyde resins.

Organic solvents which can be used in preparing the compositions of this invention are, preferably, those which are substantially water-miscible, either in the form of a single polar compound or as a mixture which can include non-polar substituents. Suitable organic solvents, either alone or in admixture, include diisobutyl ketone, methyl propyl ketone, methyl isobutyl ketone, hydroxyethyl acetate, 2-ethoxyethyl acetate, propylene glycol monomethyl ether, propylene glycol monoethyl ether, ethylene glycol monopropyl ether, ethylene glycol monobutyl ether, ethylene glycol, diethylene glycol, propylene glycol, butylene glycol, diethylene glycol monobutyl ether, n-propanol, isopropanol, n-butanol, t-butanol, amyl alcohol, cyclohexanol and the like. Non-polar solvents which can be included as a minor constituent of the organic solvent component include aliphatic and aromatic hydrocarbons, such as naphtha, heptane, hexane, mineral spirits, toluene, xylene and the like.

In order to obtain water dispersible resins, the carboxylic acid groups of the acrylic resin must be partially or completely neutralized with ammonia or an amine which is volatile in the film under curing conditions. Examples of such amines are ethylamine, butylamine, dimethylamine, diisopropylamine, dimethylethylamine, benzylamine, ethanolamine, diethanolamine, triethanolamine, methyldiethanolamine, dimethylethanolamine, N-methyl morpholine, and the like. Generally, about 0.4 to about 0.9 equivalent of ammonia or amine are used for each equivalent of acid in the acrylic resin.

Low molecular weight polyesters (molecular weights of about 500 to about 5000) and waxes, such as carnauba and paraffin waxes can be added to improve flow properties.

In preparing the compositions of this invention, the epoxy resin, phenoxy resin, acrylic resin, novolac resin and resol resin are dissolved in a water-miscible solvent, an amine is then added to salt the acid groups in the acrylic resin and then water is added to form a dispersion.

The amounts of epoxy resin, phenoxy resin, acrylic resin, novolac resin and resol resin used in the compositions of this invention are: about 35 to about 55 weight percent, preferably about 35 to about 50 weight percent, epoxy resin; about 7 to about 30 weight percent, preferably about 10 to about 25 weight percent, acrylic resin; about 4 to about 30 weight percent, preferably about 15 to about 25 weight percent, phenoxy resin, about 5 to about 15 weight percent, preferably about 10 to about 15 weight percent, novolac resin and 3 to about 10 weight percent, preferably about 5 to about 10 weight percent, resol resin. The weight percentages are based on the total weight of epoxy resin, acrylic resin, phenoxy resin, novolac resin and resol resin.

The composition can be modified with up to about 5 weight percent aminoplast resin, said weight percent being based on the total weight of the composition. Preferably, the composition will contain about 0.5 to about 2 weight percent urea-formaldehyde resin and about 0.5 to about 2 weight percent triazine formaldehyde resin.

The compositions of the invention can be further modified by the addition of up to about 30 weight percent based on the total weight of the composition of a polyvinyl chloride resin. Such reins can be homopolymers of vinyl chloride, or copolymers of vinyl chloride and vinyl acetate or ethylene with or without a small amount of acrylic acid. The polyvinyl chloride resin can be added as an emulsion or dispersion in water, or as a solution in an organic solvent. Preferably, the polyvinyl chloride resin is added as a finely divided solid and is ground into the composition.

The water and organic solvent are present in the compositions of this invention in the following amounts based on the weight of water and organic solvent: about 12.6 to about 32.6 weight percent organic solvent and about 67.4 to about 87.4 weight percent water. The preferred amounts are about 17.6 to about 27.6 weight percent organic solvent and about 62.4 to about 82.4 weight percent water.

The solids content, i.e., the weight percent of the film forming components in the coating composition, will vary from about 20 to about 50 weight percent and, preferably, about 25 to about 40 weight percent.

The coating compositions of this invention are useful as coating compositions for the interior of aluminum and steel cans, but are particularly useful for the ends or closures of such cans. The can ends are coated by roll coat applications to a dry thickness of about 1.5 to about 12 milligrams/square inch. The coatings are cured by heating in ovens to metal temperatures of 320° F. to 500° F. The total residence time in the ovens will vary from about 2 seconds to about 12 minutes.

The coatings on metal sheets which are to be fabricated into can ends, particularly can ends which contain easy opening tabs, are cured by two different processes. One process, called the sheet bake process, involves coating metal sheets having dimensions of about 35 inches by 36 inches. These sheets are then placed upright in racks and are placed in ovens for about 7 to about 12 minutes at peak metal temperatures of about 320° F. to about 400° F. The other process is coil coating. Enormous rolls of thin gage steel or aluminum are unwound, coated, heat cured and rewound. The total heating time in the oven is about 8 to about 30 seconds with peak metal temperatures reaching about 400° to about 475° F.

In other applications, i.e., as metal primer coatings, the coating compositions are cured at a temperature of about 300° F. to about 500° F. for a time sufficient to obtain a cure. The coating compositions can be formulated into clear coatings or into pigmented coatings. Other additives which can be incorporated into the coating compositions are coalescing solvents, leveling agents, wetting agents, dispersions of other resins, water soluble resins, thickening agents, suspending agents surfactants, defoamers, adhesion promoters, corrosion inhibitors, colorants and the like.

The cured coating compositions of this invention are evaluated by the following tests:

ENAMEL RATER

The Enamel Rater test is used to determine the amount of metal exposure (measured in milliamperes) after the coated metal has been fabricated into beverage can ends. This test is conducted using a Waco Enamel Rater with an Enamel Rater end-cup attachment. The end-cup, which contains an electrode, is filled about half way with 1 percent electrolyte solution. The end to be tested is placed on the cup with the coated side toward the inside of the cup. The cup is then rotated so that the electrolyte solution is in contact with the coated end. The electrode in the cup should be covered by the electrolyte solution. The other electrode is placed in contact with the uncoated side of the end. A 12 volt potential is applied between the two electrodes. Any current leakage is measured in milliamperes. A reading of 0 to 25 ER average is excellent; 25 to 50 is good; 50 to 75 is border line; 75 to 100 is poor; and over 100 is failure.

FEATHERING

This test is used to check for frilling along the edge of the opening after the pull-tab has been removed. Coated ends are placed in a water bath heated to 180° F. with the tab side down for 10 minutes. After 10 minutes, the ends are removed and wiped dry with a lint-free towel to remove excess water. The tab is then pulled loose and the edges of the opening are observed for coating frilling, i.e., loss in adhesion or uneven tearing of the coating. The coatings are rated according to the following scale:

| | |
|---|---|
| 10 | Perfect |
| 9–8 | Trace to Slight Failure |
| 7 | Slight Failure |
| 6–5 | Moderate Failure |
| 4–0 | Failure |

MEK RESISTANCE

This test is conducted to determine the solvent resistance of the cured coatings. The coatings are rubbed with a cloth saturated with methyl ethyl ketone. The resistance is determined by the number of double rubs required to dissolve the coatings.

PASTEURIZATION

This test is used to determine the adhesion and blush resistance of coatings after being submitted to hot water. The coated can ends are placed in 180° F. water for 10 minutes. They are then removed from the water, dried and cross-hatched by a scribe with at least 3 vertical and 3 horizontal lines. No. 610 Scotch brand cellophane tape is firmly placed over the crosshatched area and is then pulled straight up from the surface of the panel. Adhesion is measured by the amount of coating which remains on the panel. The blush resistance of the coatings is also determined by observing coatings 5 minutes after removal from the water. Blushing is a milky discoloration or haze in the film, generally uniform over the whole area but sometimes blotchy or spotty.

The following examples are presented to more clearly define the invention. Parts and percentages, unless otherwise designated, are parts and percentages by weight.

EXAMPLE 1

To a suitable reactor were added 400 parts of a glycidyl polyether of Bisphenol A having an epoxide equivalent weight of about 2200–2300, 250 parts of diethylene glycol monobutyl ether and 50 parts of an acetylated, alkyl ester of citric acid. Heat was applied to dissolve the glycidyl polyether and to raise the temperature to 320° F. When the 320° F. temperature was reached, 250 parts of phenoxy resin having an average molecular weight of 18,000–21,000 were added. The temperature was held at 320° F. for 45 minutes. The temperature was lowered to 260° F. and 120 parts of n-butanol were added. The temperature was lowered to 200° F. and 182 parts of acrylic resin solution, 80 parts of resol resin and 120 parts of novolac resin were added over a 30 minute period while holding the temperature at 200° F. The acrylic resin was made from 45 weight percent styrene, 21.14 weight percent ethylacrylate and 33.86 weight percent acrylic acid at 55 percent solids in a mixture of water, n-butanol and ethylene glycol monobutyl ether. The novolac resin was the reaction product of nonyl phenol and formaldehyde having a molecular weight of about 1500–2300. The resol resin was the reaction product of Bisphenol A and formaldehyde having a specific gravity of 1.22–1.24, a Stroke Cure at 185° C. of 105–125 seconds and a softening point of 70–80° C.

2-Dimethylethanol amine, 44 parts, was added over a 10 minute period while keeping the temperature at 200° F. The temperature was held at 200° F. for 30 minutes. Deionized water, 870 parts, was slowly added with stirring over a one hour period while allowing the temperature to drop to 150° F. Agitation was continued for 3 hours allowing the temperature to drop to room temperature. An anionic wax emulsion, carnauba and synthetic wax at 25 percent solids, 160 parts, was added. The resulting coating composition was then filtered and stored. The composition had a viscosity of 77 seconds, No. 4 Ford cup, and a solids content of 39.06 percent.

Aluminum panels were coated with the coating composition at a film weight of 7–8 mg per sq. in. The coatings were cured by heating at 475° F. for 2–4 seconds. The coated aluminum panels were then fabricated into easy opening can ends. The coatings were tested for metal coverage (Enamel Rater Test), solvent resistance (MEK double rubs), pasteurization, and feathering. The results of these tests are shown in the Table II. The components of the coating composition are shown in Table I.

EXAMPLE 2

Using the same procedure described in Example 1, a coating composition was prepared from 40 parts of glycidyl polyether of Bisphenol A, 25 parts of phenoxy resin, 10 parts of acrylic resin and 12 parts of novolac resin, all of the resins being the same as those described in Example 1. Included with the reactants were 8 parts of resol resin and 5 parts of an aqueous anionic emulsion of carnauba and paraffin waxes having a solids content of 25 percent. Aluminum panels were coated with the composition and were cured and fabricated using the same procedure described in Example 1. The coating composition components and test results are shown in Tables I and II respectively.

EXAMPLE 3

Using the same procedure described in Example 1, a coating composition was made from 40 parts of glycidyl polyether of Bisphenol A, 15 parts of phenoxy resin, 20 parts of acrylic resin and 11 parts of novolac resin, all of which components being the same as those described in Example 1. Also included were 7 parts of resol resin and 5 parts of wax emulsion which were described in Example 2. Additional components were 1 part of methoxymethyl melamine and 1 part of an isobutylated urea-formaldehyde resin at 60 percent non-volatiles in isobutyl alcohol. Composition and test results are shown in Tables I and II respectively.

Comparative examples, identified as Examples A, B, C, D and E in the tables, show one or more inferior properties which result when either a novolac resin or a resol resin is not included in the composition.

TABLE I

| | Coating Composition | | | | | | | | |
|---|---|---|---|---|---|---|---|---|---|
| Example | Epoxy Resin % | Phenoxy Resin % | Acrylic Resin % | Novolac Resin % | Resol Resin % | Melamine Resin % | UF Resin % | Wax % | Plast. % |
| 1 | 39.2 | 24.5 | 9.8 | 11.8 | 4.9 | — | — | 4.9 | 4.9 |
| 2 | 40 | 25 | 10 | 12 | 8 | — | — | 5 | — |
| 3 | 40 | 15 | 20 | 11 | 7 | 1 | 1 | 5 | — |
| A | 59.3 | 4.95 | 19.9 | 4.95 | — | — | — | 1 | 9.9 |
| B | 49.5 | 14.8 | 19.8 | — | 4.95 | — | — | 1.05 | 9.9 |
| C | 53.5 | 6.3 | 25.3 | — | 12.6 | — | — | 2.3 | — |

TABLE I-continued

| | Coating Composition | | | | | | | | |
|---|---|---|---|---|---|---|---|---|---|
| Example | Epoxy Resin % | Phenoxy Resin % | Acrylic Resin % | Novolac Resin % | Resol Resin % | Melamine Resin % | UF Resin % | Wax % | Plast. % |
| D | 44.1 | 24.5 | 9.8 | — | 9.8 | — | — | 2.0 | 9.8 |
| E | 46.5 | 24.5 | 9.8 | — | — | 6.9 | — | 2.4 | 9.8 |

TABLE II

| | Physical Properties of Coatings | | | | | | | |
|---|---|---|---|---|---|---|---|---|
| | 2–4 Second Bake | MEK Double | Enamel Rater | | 10 min in 180° F. Water | | Feather- | |
| Example | °F. | Rubs | AVG. | Range | Blush | Adhesion | ing | Stain |
| 1 | 475 | 20 | 4.7 | 2–13 | 10 | 10 | 9 | 10 |
| | 485 | 19 | 3.1 | 1–6 | 10 | 10 | 9 | 10 |
| 2 | 425 | 9 | 4.0 | 2–6 | 8 | 10 | 10 | 10 |
| | 445 | 10 | 2.4 | 1–7 | 10 | 10 | 9 | 10 |
| | 465 | 10 | 5.1 | 2–11 | 9 | 10 | 8 | 10 |
| | 475 | 17 | 4.6 | 2–8 | 10 | 10 | 9 | 10 |
| | 485 | 20 | 3.6 | 2–8 | 10 | 10 | 9 | 10 |
| 3 | 425 | 12 | 1.0 | 0–2 | 9 | 10 | 9 | 10 |
| | 450 | 19 | 1.1 | 0–4 | 10 | 10 | 9 | 10 |
| | 475 | 40 | 1.1 | 0–2 | 10 | 10 | 9 | 10 |
| | 500 | 50 | 3.3 | 2–9 | 10 | 10 | 10 | 10 |
| A | 475 | 18 | 5 | 1–12 | 2 | 10 | 9 | 10 |
| | 505 | 24 | 1.3 | 0–4 | 9 | 10 | 9 | 10 |
| B | 475 | 22 | 1.8 | 0–7 | 5 | 10 | 6 | 10 |
| | 505 | 27 | 0.8 | 0–3 | 10 | 10 | 6 | 10 |
| C | 475 | 30 | 1.4 | 0–4 | 10 | 10 | 6 | 10 |
| D | 475 | 25 | 4.5 | 0–11 | 10 | 10 | 4 | 10 |
| | 450 | 6 | 9.8 | 4–40 | 5 | 10 | 1 | 10 |
| E | 475 | 15 | 7.5 | 0–40 | 10 | 10 | 5 | 10 |
| | 450 | 11 | 41 | 8–110 | 0 | 10 | 6 | 10 |

EXAMPLE 4

To 90 parts of the coating composition described in Example 3 were added 10 parts of finely divided polyvinyl chloride (dispersion grade from B.F. Goodrich Co.—Geon 198). The mixture was ground in a sand mill to produce a smooth homogeneous composition. Aluminum panels were coated with the composition using the procedure described in Example 1. The coatings were cured by heating at 450° F. for 5 seconds. The coated aluminum panels were then fabricated into easy opening can ends. The coatings were then tested with the following results: The Enamel Rater Average was 6.7; solvent resistance was 12 MEK double rubs; water resistance (10 minutes in 180° F. water) was 8 (blush) and 10 (adhesion); feathering was 10 and stain resistance was 10.

The principles, preferred embodiments and modes of operation of the present invention have been described in the foregoing specification. The invention which is intended to be protected herein, however, is not to be construed as limited to the particular forms disclosed, since there are to be regarded as illustrative rather than restrictive. Variations and changes may be made by those skilled in the art without departing from the spirit of the invention.

What is claimed is:

1. A heat curable aqueous coating composition comprising an aqueous dispersion of an ammonia or amine salted resinous composition comprised of:
   (a) about 35 to about 55 weight percent epoxy resin;
   (b) about 7 to about 30 weight percent acrylic resin;
   (c) about 10 to about 30 weight percent phenoxy resin;
   (d) about 5 to about 15 weight percent alkylated phenol novolac resin; and
   (e)(3) to about 10 weight percent resol resin,
said weight percent being based on the total weight of (a), (b), (c), (d) and (e),
wherein the epoxy resin is a glycidyl polyether of a dihydric phenol having an epoxide equivalent weight of about 1200 to about 6000;
wherein the acrylic resin is a copolymer of a polymerizable ethylenically unsaturated carboxylic acid monomer and a monomer copolymerizable therewith, said comonomer being free of acid groups, wherein the polymerizable acid is present in the acrylic resin in the amount of about 5 to about 45 weight percent based on the total weight of the acrylic resin, wherein the phenoxy resin is the reaction product of epichlorohydrin and Bisphenol A having a molecular weight of about 6,000 to about 85,000
wherein the alkyl substituent in the alkylated phenol novolac resin contains about 8 to about 12 carbon atoms, and wherein the resol resin has a softening print of about 55 to about 85° C. and a cure time on a hot plate at 185° C. of about 60–130 seconds.

2. The coating composition of claim 1 wherein the epoxy resin is present in the amount of about 35 to about 50 weight percent, the acrylic resin is present in the amount of about 10 to about 25 weight percent, the phenoxy resin is present in the amount of about 15 to about 25 weight percent, the novolac resin is present in the amount of about 10 to about 15 weight percent and the resol resin is present in the amount of about 5 to about 10 percent.

3. The coating composition of claim 1 wherein up to about 10 weight percent of the novolac resin is replaced with a novolac resin which contains no alkyl substituents or 1 to 7 carbon atoms in an alkyl substituent on the aromatic ring.

4. The composition of claim 1 wherein the epoxy resin is a glycidyl polyether of bisphenol A having an epoxide equivalent weight of about 2000 to 2800.

5. The composition of claim 1 wherein the acrylic resin is a copolymer of styrene, ethyl acrylate and acrylic acid.

6. The composition of claim 5 wherein the acrylic acid is present in the acrylic resin in the amount of about 20 to about 40 weight percent.

7. The composition of claim 1 wherein the novolac resin is a nonyl phenol novolac resin.

8. The composition of claim 1 wherein the resol resin is a bisphenol A-formaldehyde resin.

9. The composition of claim 1 which contains up to about 5 weight percent aminoplast resin.

10. The composition of claim 9 wherein the aminoplast resin is a urea-formaldehyde resin, a triazine-formaldehyde resin or mixture thereof.

11. The composition of claim 10 wherein the aminoplast resin is present in the amount of about 0.5 to about 2 weight percent isobutylated urea-formaldehyde resin and about 0.5 to about 2 weight percent alkoxymethyl melamine resin.

12. The composition of claim 1 which contains up to about 30 weight percent polyvinyl chloride resin.

* * * * *